United States Patent [19]

Ballatore et al.

[11] Patent Number: 4,538,032
[45] Date of Patent: Aug. 27, 1985

[54] INTERFACE CIRCUIT WITH IMPEDANCE ADAPTATION MEANS

[75] Inventors: Daniel Ballatore, Bar-sur-Loup; Yves A. Bonnet, Saint Laurent due Var; Michel F. Ferry, Vallauris; Christian A. Jacquart, Gattieres, all of France

[73] Assignee: International Business Machines Corporation, Armonk, N.Y.

[21] Appl. No.: 433,346

[22] Filed: Oct. 8, 1982

[30] Foreign Application Priority Data

Oct. 28, 1981 [EP] European Pat. Off. ........ 81430035.6

[51] Int. Cl.³ .................... H04B 3/03; H04M 1/76; H04M 19/00
[52] U.S. Cl. .................... 179/170 D; 179/170 NC; 179/77
[58] Field of Search ............. 179/2.51, 16 A, 16 AA, 179/16 F, 18 FA, 70, 77, 81 R, 170 R, 170 D, 170 NC

[56] References Cited

U.S. PATENT DOCUMENTS

| | | | |
|---|---|---|---|
| 4,002,852 | 1/1977 | Martin | 179/16 F |
| 4,115,660 | 9/1978 | Croisier et al. | 179/2.51 |
| 4,119,806 | 10/1978 | Baratin | 179/18 FA |
| 4,128,743 | 12/1978 | Huellwegen | 179/170 R |
| 4,277,655 | 7/1981 | Surprenant | 179/16 F |
| 4,319,093 | 3/1982 | Bars | 179/16 AA |

Primary Examiner—Gene Z. Rubinson
Assistant Examiner—R. Vaas
Attorney, Agent, or Firm—Gerald R. Woods

[57] ABSTRACT

This interface circuit between a bidirectional line (Lg) and a telephone exchange includes a high frequency transformer (Tr) whose secondary (N2) is connected to said line through a detector circuit (DET) and whose primary (N1) is connected to the switching network of said telephone exchange and to a high frequency carrier source. The circuit further includes means for adjusting the impedances seen across the points where the telephone line is connected to the exchange, so as to meet specified values applicable to the particular location of the exchange. The impedance adaptation means include means (A1) for amplifying the line current variations seen at the center tap (K) of the high frequency transformer (Tr), addition means (Σ1) for adding the output from (A1) to the voice signal to be sent to the telephone line (Lg), and second amplification means (A2) responsive to the output from (Σ1) to drive said center tap (K).

7 Claims, 5 Drawing Figures

INTERFACE CIRCUIT WITH IMPEDANCE ADAPTATION MEANS

TECHNICAL FIELD

This invention relates to interface circuits located between a central unit and remote terminals for use, in particular, in the field of telephony.

STATE OF THE ART

Many systems are known in which terminals are connected to a central unit via transmission lines of varying lengths. It is essential, if such systems are to operate satisfactorily, that particular attention be paid to the adjustment of a number of parameters such as the impedances seen across the points where the line is connected to the central unit. This invention provides an impedance adjusting means which is extremely flexible and suitable for use, in particular, in the field of telephony.

Telephone networks usually include central units (public or private telephone exchanges) to which subscribers' telephones are connected by means of two-wire telephone lines. No matter how remote from the exchange a subscriber's telephone may be, that is, regardless of the length of the connecting line, the AC impedance seen from the central unit (or line impedance) should be relatively constant and equal to a predetermined value. This value is usually specified in national or international standards. It is particularly desirable for the telephone network to include means for adjusting the line impedances to whatever value is prescribed in applicable standards. Such means are usually provided in the interface circuits connecting the two-wire line to the associated telephone exchange.

Also, the telephone exchange supplies the subscribers' telephone sets with biasing DC currents which must be adjusted to normalized values. To this end, the interface circuits provided in conventional telephone networks use DC voltage sources connected to the telephone lines by means of elements called feeders. To prevent power losses in such elements, it has been proposed in U.S. Pat. 4,115,660 to use a non-dissipative type of feeder. This feeder yields very good results through the expedient of "simulating" a predetermined DC impedance. However, it does not permit adjusting both the line impedance and the biasing currents. In other words, the feeder does not allow both the AC and the DC impedances to be simulated in an interface circuit between a central unit and a transmission line.

It is an object of this invention to provide an interface circuit located between a central unit and a transmission line. The interface circuit comprises means for adjusting the AC and DC impedances seen across the points where the line is connected to the central unit.

More precisely, it is an object of this invention to provide an interface circuit for a telephone exchange. The interface circuit is located between a two-wire telephone line and the switching network of the telephone exchange, and comprises means for supplying a DC current to a subscriber's telephone set connected to said two-wire line, and means for routing the low-frequency voice signals from the subscriber's telephone to the switching network and vice versa. The interface circuit is characterized in that it comprises adaptation means for adjusting the impedances seen across the points where the telephone line is connected to the exchange unit, said adaptation means including means for measuring the current variations in said two-wire line, first amplification means for amplifying said variations, addition means connected to said first amplification means for adding together the signals provided by said first amplification means and the low-frequency signals to be sent over said two-wire line, and second amplification means connected to said addition means and driving said telephone line, said impedance adjustment being performed by acting upon the gains of said first and second amplification means.

The foregoing and other objects, features and advantages of the invention will be apparent from the following detailed description of a preferred embodiment of the invention, as illustrated in the accompanying drawings.

DETAILED DESCRIPTION OF THE INVENTION

Figure 1:
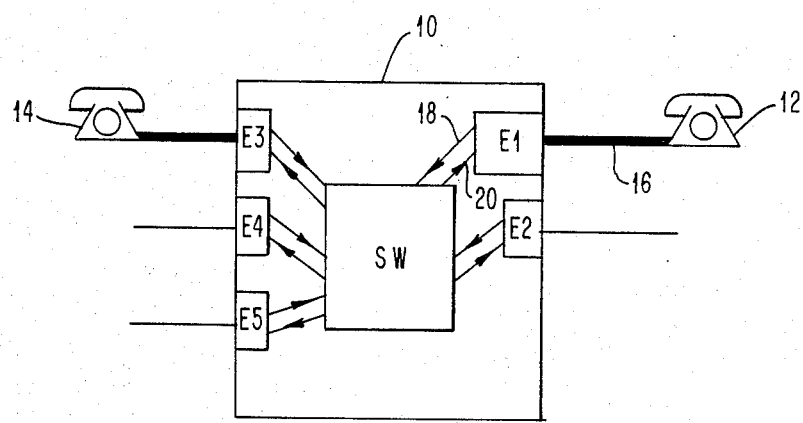
FIG. 1 is a schematic diagram of a telephone exchange.

FIG. 1 is a very schematic illustration of the various components of a telephone exchange 10 to which subscribers' telephones 12, 14, etc., are connected. The exchange comprises a switching network SW and interface circuits E1, E2, ... . These interface circuits are more specifically called extension circuits or trunks depending on whether they pertain to a private branch exchange (PBX) or to a public exchange or central office (CX). While the present invention can be used with either type of telephone exchange, it will be more particularly described hereafter in relation to a PBX. The telephone set 12 is connected to an interface circuit (E1) via a bidirectional two-wire line 16. Line 16 serves in particular to transfer voice signals from the telephone set to the exchange and vice versa. Such signals occupy a range of low-frequencies (LF) called telephone bandwidth that extends from about 300 to about 3,000 or 3,500 Hz, for example.

The low-frequency signals received from or transmitted to the telephone set over a bidirectional, two wire path 16 are typically routed between the interface circuit and the switching network over two separate unidirectional, two wire paths 18 and 20. The transfer of signals on the bidirectional two-wire line 16 to the separate unidirectional paths (or lines) 18 and 20 is termed herein two-wire/four-wire conversion.

The switching network SW establishes the electrical connections required to interconnect two subscribers, that is to say, two interface circuits.

Where a private type of telephone exchange (PBX) is used, the PBX supplies the subscribers' telephone with AC and DC currents that respectively serve, in particular, to make the telephone of a called subscriber ring and to power its microphone. These currents usually are generated in the interface to which a given subscriber is connected.

Many parameters such as the length and the quality of the lines (for example, the line may or may not be conditioned) can have a detrimental effect upon the operation of the telephone network. Also, certain characteristics of the network must meet national and/or international standards. This applies in particular to the impedances seen across the points where each two-wire subscriber line is connected to the telephone exchange 10. It would therefore be desirable for manufacturers of telephone exchanges to make provision for a comparatively simple means of adjusting said impedances to any prescribed values at the time the exchange is installed. Such means should make it possible to adjust the DC impedance, or at any rate the impedance for frequencies below 300 Hz, as well as the AC impedance for frequencies in the range from about 300 to about 3,000 Hz, as seen across those points where a two-wire line such as 16 is connected to the telephone exchange 10. The present invention provides a simple means of adjusting, within an interface circuit such as E1, the impedances seen at the input of the telephone exchange 10, that is, across the points where line 16 is connected thereto. The invention can be used in many types of interface circuits but will be described in detail hereafter from the particular standpoint of its use in the interface circuit described in the above-mentioned U.S. Pat. No. 4,115,660.

Figure 2:
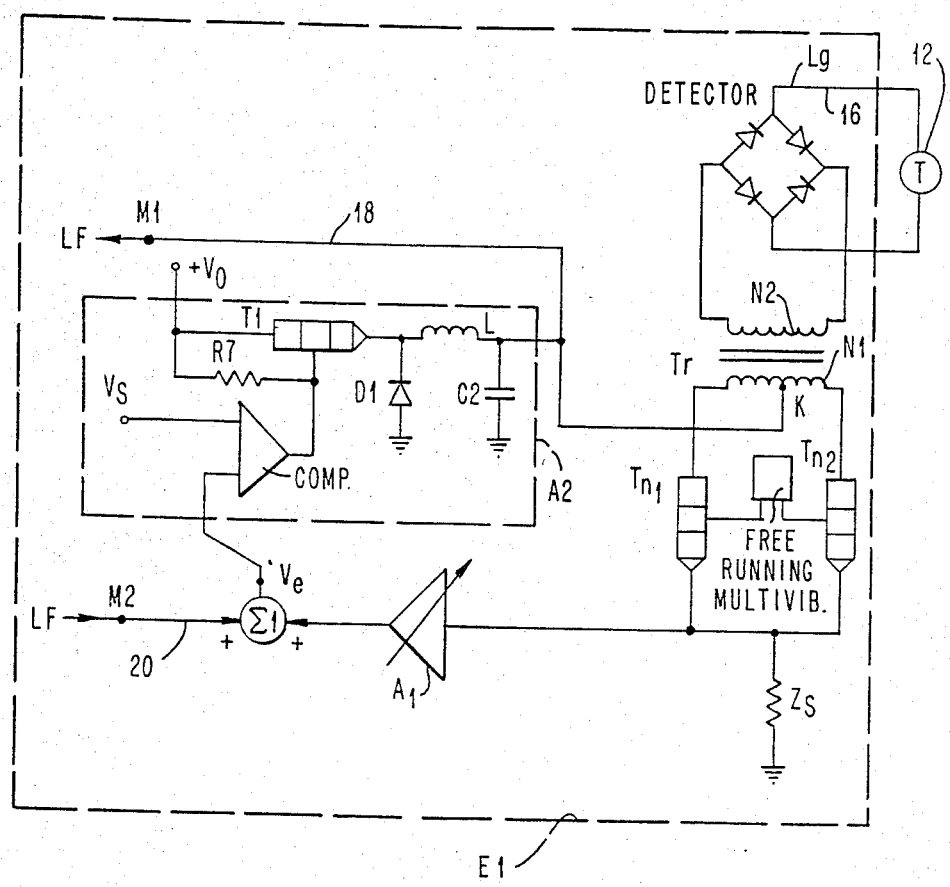
FIG. 2 is a schematic diagram of an interface circuit in accordance with the invention.

FIG. 2 includes some of the elements illustrated in FIG. 2 of the above-mentioned U.S. Pat. In both figures, like reference signs identify like elements. The telephone set 12 is designated T and the telephone line 16 connecting the telephone set T to the exchange 10 through the interface circuit E1 is designated Lg. The interface circuit includes a high-frequency transformer Tr having a primary winding N1 whose end terminals are grounded through switches consisting of transistors $T_{n1}$ and $T_{n2}$ which are alternately turned on and off at a high frequency rate by a free-running multivibrator F. The secondary winding N2 of transformer Tr is connected to the telephone line Lg through a detector circuit DET comprising a rectifier bridge. The center tap K of the primary N1 of transformer Tr is connected to a voltage source Vo through a switching circuit which, as shall be seen, acts as an amplifier A2. Assuming that voltage Vo is fed to the center tap K, the alternate closures of switches $T_{n1}$ and $T_{n2}$ cause a high-frequency carrier to be generated, which carrier is modulated by the low-frequency voice signal appearing at K and which either comes from the telephone T and is then routed over line 18 to the switching network SW, or is received from the network SW and is then routed over line 20 to the telephone T. For more details on the processes involved, i.e., on the manner in which the low-frequency signals are transmitted from the subscriber's telephone 12 to the switching network SW and vice versa by modulating a high-frequency carrier, reference should be made to U.S. Pat. No. 4,115,660, mentioned earlier. It is also stated in said patent that, to prevent all or part of the low-frequency signal from being diverted to the voltage source Vo, a low-frequency blocking circuit (choke) of impedance Zo, is used.

The interface circuit must also supply the line with the DC currents mentioned earlier, and allow these currents to be adjusted. As explained in the aforementioned U.S. Pat. No. 4,115,660 (see FIGS. 6 and 7 thereof), this can be done by connecting the voltage source Vo to a non-dissipative circuit. In the patent, this circuit supplies DC current to the line Lg, but does not provide for easy adjustment of the impedance seen across the end terminals of telephone line 16. The present invention provides a circuit for adjusting such impedance in accordance with the specific needs of the customer, both for the low-frequency signals within the telephone bandwidth and for DC currents. The invention further enables the circuit to perform a feeding function, no matter what specific standards or requirements must be met by the telephone exchange 10.

The emitters of transistors $T_{n1}$ and $T_{n2}$ are here connected to ground through a resistor $Z_S$. The voltage across $Z_S$ (or between K' and ground) is representative of the variations of the current flowing through line 16. This signal is amplified by a first amplifier A1 whose gain varies as a function of frequency. The output of amplifier A1 is here connected to an adder $\Sigma 1$ which also receives the low-frequency (LF) signal from switching network SW (via line 20). The output of $\Sigma 1$ is fed to one of the inputs of a comparator COMP whose second input receives a sawtooth signal $V_S$. The comparator COMP forms part of a second amplifier A2 intended to amplify the signal provided by adder $\Sigma 1$, as will be seen. The amplifier A2 comprises a $\pi$-cell similar to the one used in the aforementioned patent and including a diode D1, an inductor L and a capacitor C2. The cell is powered by a voltage source +Vo through a transistor switch T1 which opens under control of the output from comparator COMP. The output of the $\pi$-cell is connected to center tap K of the primary of transformer Tr. Also connected to center tap K is the line 18 leading to the switching network SW.

Taking the properties of transformers into account, the impedance of the telephone line Lg may be considered as being proportional to that seen across points K and K'. For simplicity, it will be assumed that transformer Tr has a transformation ratio equal to unity, and thus the proportionality coefficient is equal to unity. Thus, the AC and DC impedances (as seen by the line, at the input of the interface circuit) that must be adjusted to ensure compliance with applicable standards will be those seen across points K and K'. In most cases, such impedance will only have to be adjusted to a given value for those frequencies which lie below 300 Hz and to another given value for frequencies in the range from 300 to 3,000 or 3,500 Hz.

Figure 3:
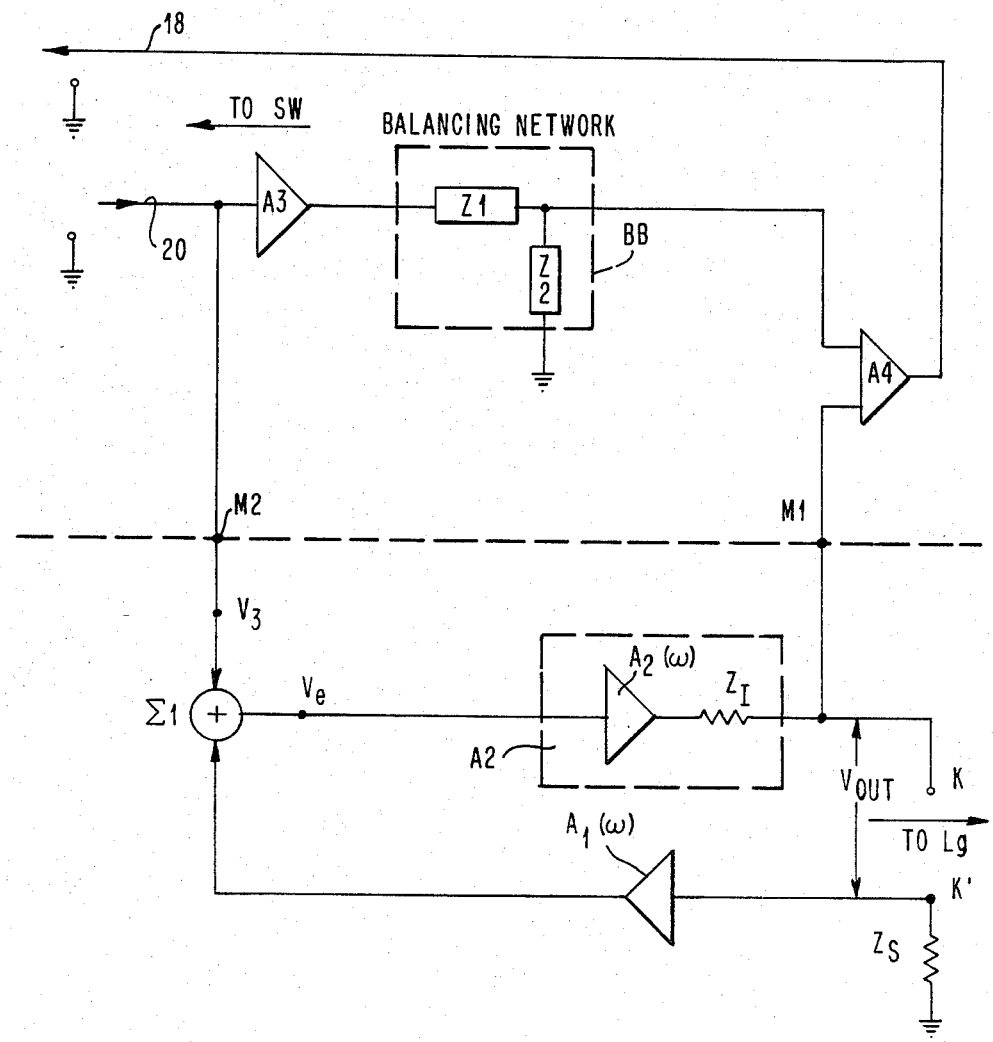
FIG. 3 is another schematic diagram of the interface circuit of the invention.

The lower part of FIG. 3 is a schematic diagram similar to that of FIG. 2. The block A2 thereof is shown in FIG. 3 as an amplifier of gain A2($\omega$). The symbol $\omega$ is intended to indicate that the parameter associated therewith varies as a function of frequency. The current supplied by amplifier A2 flows through a load exhibiting an impedance $Z_I$. If we designate as $Z_T(\omega)$ the impedance of the interface circuit as seen by the telephone line, we may write:

$$Z_T = [A1(\omega) \times A2(\omega) + 1]Z_S + Z_I \tag{1}$$

If $$A1(\omega) \times A2(\omega) >> 1 \text{ and } Z_I << A1(\omega).A2(\omega).Z_S$$

we get:

$$Z_T(\omega) = A1(\omega).A2(\omega).Z_S \tag{2}$$

Thus, the impedance $Z_T$ is substantially proportional to $A1(\omega).A2(\omega)$.

It will be seen that by adjusting the gains A1($\omega$) and/or A2($\omega$) as a function of frequency, the value of $Z_T$ and, therefore, the impedance seen by the line at the input of the interface circuit, can be varied. In view of Eq. (2), we may consider the interface circuit thus far described as being equivalent to a voltage source $[A2(\omega).V_e]$ whose output current is fed to a series connected load having an impedance $Z_T$, with the entire circuit being positioned between points K and K'. In practice, all that need be done at the time the PBX 10 is installed to ensure that the value of $Z_T$ is as prescribed in applicable standards will be to adjust A1 and/or A2. Also, the interface circuit E1 itself can be made to adjust $Z_T$ to values normalized as a function of frequency. In particular, the DC impedances (generally at frequencies below 300 Hz) and the AC impedances (in the range from 300 to 3,500 Hz) can be adjusted separately. For example, the impedance can be adjusted to 600 ohms in the range from 300 to 3,500 Hz, and to 800 ohms in the range from 0 to 300 Hz. It should be noted that, in practice, the impedance at 300 Hz changes gradually rather than suddenly.

Figure 4:
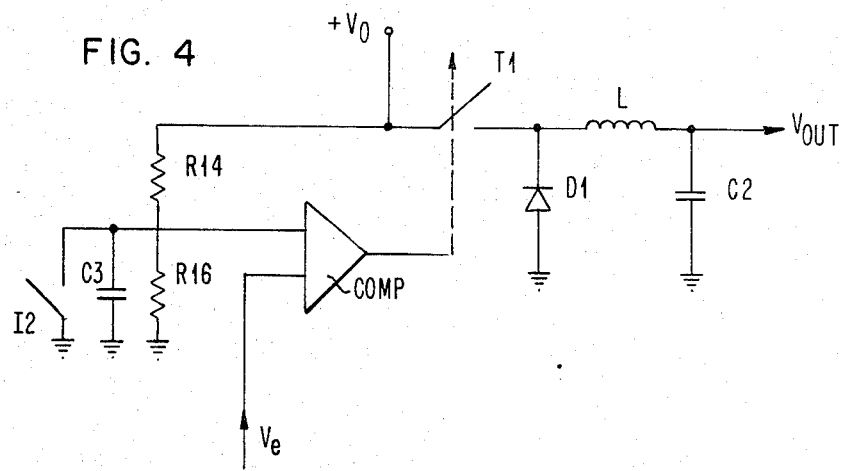
FIG. 4 shows a component of the circuit of FIG. 2.

If we designate the output voltage of circuit A2, i.e., the voltage across C2, as $V_{out}$, we may write:

$$A2(\omega) = V_{out}/V_e$$

where
  $V_e$ is the voltage supplied by adder $\Sigma 1$ to the input of A2, and
  $V_{out}$ is the voltage at the output of A2, as shown in FIG. 4.

The comparator COMP compares voltages $V_e$ and $V_s$ (where $V_s$ is a sawtooth voltage of peak amplitude $V_{s\,max}$) and supplies a logic signal controlling the openings and closures of the switch comprised of transistor T1. The DC voltage $+V_o$ is therefore applied to the $\pi$-cell (D1, L, C2) in accordance with said closures.

If we designate as $Z_{C2}$ and $Z_L$ the respective impedances of C2 and L as a function of frequency, we may write:

$$A2(\omega) = \frac{V_{out}}{V_e} = \frac{V_o}{V_{s\,max}} \times \frac{Z_{C2}}{Z_L + Z_{C2}}. \qquad (3)$$

Accordingly, the gain $A2(\omega)$ can be controlled by adjusting one or more of the parameters in Eq. (3) above. In practice, all that will be required in most cases will be to adjust $A2(\omega)$ to a given value for frequencies in the range from 0 to 300 Hz and to another value for frequencies between 300 and 3,000 or 3,500 Hz. In particular, the amplitude $V_s$ max of voltage $V_s$ can be adjusted so as to achieve the desired result.

Eq. (3) also shows the sensitivity of gain $A2(\omega)$ to unwanted fluctuations of $V_o$ and/or $V_{s\,max}$. This sensitivity is lessened by making $V_s$ dependent on $V_o$. This is illustrated in FIG. 4 in which the circuit comprised of R14, R16, C3 and I2, supplies the voltage $V_s$.

Eq. (2) shows in particular that, if $A2(\omega) = G$ is maintained constant, the interface circuit acts as a voltage source $GV_e$ connected in series with a load having an impedance $Z_T$ and directly supplying power to the line Lg. In that case, there is no distortion of $V_e$ as a function of frequency. $Z_T$ can be set to the desired value(s) by adjusting G and/or $A1(\omega)$.

$$Z_T = G.A1(\omega).Z_S$$

It should be understood that the term "amplification" is used herein in a broad sense and that for present purposes "attenuation" could be substituted therefor. Thus, the gains $A1(\omega)$ and/or $A2(\omega)$ could either exceed or be less than 1.

As shown in FIG. 1, a two-wire connection (line 16) is used between the interface E1 and the telephone set 12, while a four-wire connection (lines 18 and 20) is provided between E1 and the switching network SW. The interface circuit so far described is particularly suitable for transferring the signals on line 16 to lines 18 and 20 or vice versa, in other words, for performing a so-called two-to-four wires conversion. To this end, the circuit shown in the upper portion of FIG. 3 is used. Line 20 connecting the switching network SW to the interface circuit supplies the low-frequency voltage designated $V_3$ to the adder $\Sigma 1$. Point K is connected to the input of a differential amplifier A4 which has its second input connected to line 20 through a balancing network BB and an amplifier A3. The output from amplifier A4 is applied to line 18 connected to the switching network SW. It can be shown that the circuit can be balanced in such a way as to enable the interface circuit to properly perform the two-to-four wires conversion, particularly under the following conditions:

$$Z1 = K(Z_T - Z_S) \cong K Z_T$$

$$Z2 = K(Z_L + Z_S) \cong K Z_L$$

$$A3 = A2$$

where $Z_L$ is the impedance of line Lg as seen across terminals K and K'.

In practice, $Z_L >> Z_S$.

As has been seen, the desired value of $Z_T$ can be obtained by adjusting the gains $A1(\omega)$ and/or $A2(\omega)$. Other parameters, such as those of the balancing network BB, can also be adjusted. These adjustments can be made, in particular, by means of circuit component switching operations. As a result, the proposed interface circuit can readily be adapted to ensure compliance with national standards or with the specific requirements of individual customers in the same country (type and quality of the lines, etc.)

Figure 5:
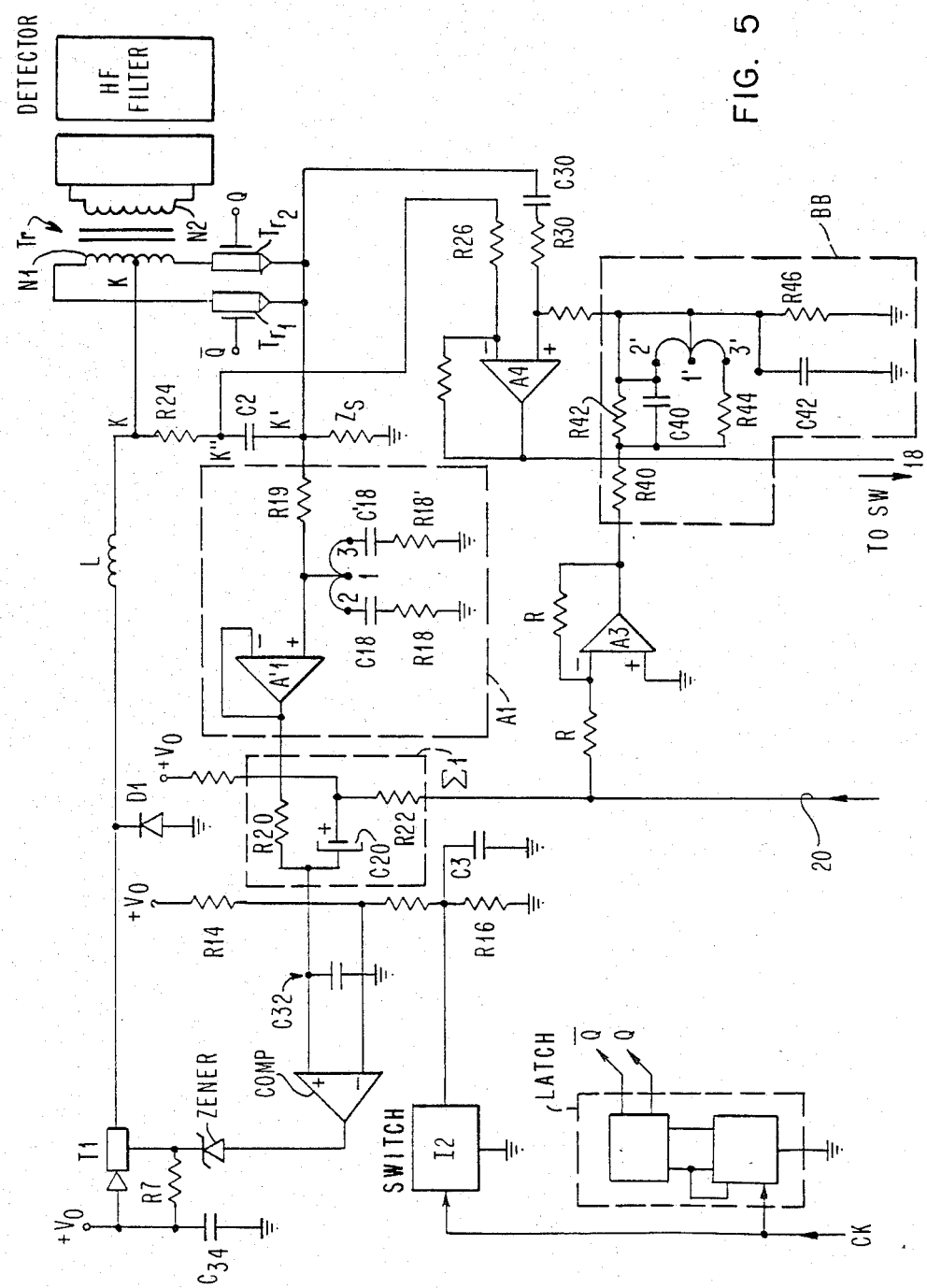
FIG. 5 is a detailed diagram of an embodiment of the interface circuit of the present invention.

FIG. 5 is a schematic diagram of the interface circuit incorporating the components illustrated in the preceding figures and which can readily be identified. It should, however, be noted that the figure includes a few minor changes which have practically no effect upon the operating principles of the interface circuit thus far described.

As shown, the input of amplifier A1 is provided with RC circuits (C18-R18 and C'18-R'18) allowing certain impedances to be adjusted by means of simple circuit switching operations. In particular, the amplifier designated here as A'1 can be adjusted so as to isolate point K' from the non-inverting input of comparator COMP in the frequency range from 300 to 3,500 Hz; in this case, loads exhibiting the desired impedances should be connected to point K, which can be done, in particular, by interconnecting points 1 and 2, an impedance of 600 ohms is obtained at point K, whereas by interconnecting points 1 and 3 some other predetermined impedance corresponding to that specified in applicable standards in a given country would be obtained. Thus, the circuit comprising A'1, R19, C18 R18, C'18 and R'18 plays the part of the amplifier A1 whose gain $A1(\omega)$ can be adjusted as a function of frequency by acting upon the values of components other than A'1.

The output from amplifier A'1 is applied to the non-inverting input of comparator COMP through a resistor R20. Line 20 also feeds the same input of COMP through a circuit that includes a resistor R22 connected in series with a capacitor C20. The circuit comprised of R20, C20, R22 that feeds COMP performs an adding function. The capacitor C32 connected to the non-inverting input of COMP is only used to filter noise voltages from the input signal. Thus, this circuit comprises the adder designated earlier as Σ1. The diagram also includes the components (R14, R16, C3 and I2) associated with COMP to perform the functions described in relation to FIG. 4.

The additional Zener diode and capacitor C34 which are shown as connected to the terminals of resistor R7 do not directly affect the operating principles of the device that constitutes the amplifier A2. The Zener diode permits adjusting the voltage level at the output of comparator COMP.

The switch I2 and the latch F are synchronized by the same clock CK (not shown). In other words, the sawtooth voltage $V_S$ is synchronized with the high frequency carrier. The low frequency signal from the switching network SW is applied to the amplifier A3 and to the adder Σ1. The output from A3 is applied to the balancing network BB comprised of RC networks (R40, R42, R44, R46, C40, C42) which may be connected in a number of ways to balance the circuit as needed, particularly by short circuiting points 1' and 2' and/or 1' and 3'. The output from the balancing network BB is applied to the non-inverting input of differential amplifier A4, which input is also connected to point K' through a series RC network (R30, C30). The second input of A4 is connected to center tap K of high frequency transformer Tr through resistors R24 and R26. Thus, the figure is slightly modified as compared with FIG. 3 in that the incoming low frequency signal is applied to both inputs of differential amplifier A4.

The output from amplifier A4 is sent to the switching network SW over line 18.

As shown in FIG. 5, the output from transformer Tr is demodulated by the rectifier bridge DET and the high frequency carrier is then filtered out, thereby introducing and additional impedance which is to be taken into consideration when calculating $Z_T$. As far as the FIG. 5 embodiment is concerned, the synthesized values of $Z_T$ are equivalent to a pure resistance when points 1 and 2 are short circuited, and to a 24 AWG line of about 2.5 km in length terminated in a 950 ohm load when points 1 and 3 are short circuited.

While the invention has been particularly shown and described with reference to a preferred embodiment thereof, it will be understood by those skilled in the art that numerous changes in form and detail may be made therein without departing from the spirit and scope of the invention.

Having thus described my invention, what I desire to protect by Letters Patent is:

1. An interface circuit between a bidirectional telephone line carrying in particular low frequency voice signals, and a telephone switching network connected to said interface circuit via a first and a second unidirectional lines, said interface circuit including means for adjusting the impedance ($Z_T$) seen by said telephone line and including:

a high frequency transformer including a primary with two end terminals and a center tap K, and a secondary;

means for connecting said secondary to said bidirectional line through a rectifier circuit;

switching means for respectively connecting the end terminals of said primary to first and second switches which alternately open and close at a predetermined frequency;

a load of impedance $Z_s$ connecting said switches to ground;

first amplification means whose predetermined gain $A1(\omega)$ is a function of frequency and which is connected to said load;

addition means connected to said first amplification means and to said first unidirectional line;

second amplification means whose predetermined gain $A2(\omega)$ is a function of frequency and which has an input from said addition means and an output to said center tap; and means for connecting said center tap to said second unidirectional line wherein said gains $A1(\omega)$ and $A2(\omega)$ are made adjustable so that the product $A1(\omega).A2(\omega)$ will be substantially proportional to $Z_T$ in a predetermined frequency range.

2. An interface circuit as claimed in claim 1, wherein said second amplification means includes:

a DC voltage source;

a $\pi$-cell whose horizontal leg comprises an inductor and whose vertical legs comprise a diode and a capacitor, respectively, said $\pi$-cell being connected to said center tap;

switching means connected in series between said DC voltage source and said $\pi$-cell;

a sawtooth voltage source having a predetermined amplitude as a function of gain $A2(\omega)$; and control means comprising a dual-input comparator one input of which is connected to said sawtooth voltage source and the other input of which is connected to the output of said addition means, said switching means being under control of the output from said comparator.

3. An interface circuit as claimed in claim 2, wherein said sawtooth voltage source includes an R-C circuit connected to said DC voltage source.

4. An interface circuit as claimed in any of claims 1 to 3, wherein the interface circuit is connected to the switching network through means for performing a two-to-four wires conversion, including:

a balancing network;

third amplification means whose input is connected to the switching circuit via said first unidirectional line and whose output is connected to said balancing network; and fourth dual-input amplification means having one input connected to said balancing network and the other input connected to said center tap, the output of said fourth amplification means being connected to said switching means via said second unidirectional line.

5. An interface circuit as claimed in claim 2 and further including means for synchronizing said sawtooth voltage with said predetermined high frequency.

6. An interface circuit as claimed in claim 3 and further including means for synchronizing said sawtooth voltage with said predetermined high frequency.

7. An interface circuit as claimed in claim 4 and further including means for synchronizing said sawtooth voltage with said predetermined high frequency.

* * * * *